United States Patent
Cecce et al.

(10) Patent No.: US 8,182,603 B2
(45) Date of Patent: *May 22, 2012

(54) CEMENT COMPOSITIONS FOR APPLYING TO CERAMIC HONEYCOMB BODIES

(75) Inventors: Anthony Joseph Cecce, Elmira, NY (US); Thomas James Deneka, Painted Post, NY (US); Kintu Odinga X Early, Painted Post, NY (US); Jeffrey Donald Roche, Corning, NY (US); Patrick David Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 625 days.

This patent is subject to a terminal disclaimer.

(21) Appl. No.: 12/313,460

(22) Filed: Nov. 20, 2008

(65) Prior Publication Data
US 2009/0142499 A1    Jun. 4, 2009

Related U.S. Application Data

(60) Provisional application No. 61/004,785, filed on Nov. 30, 2007.

(51) Int. Cl.
*C04B 28/06* (2006.01)

(52) U.S. Cl. ............ 106/600; 106/603; 501/32; 501/49; 501/53; 501/88; 501/97.1; 501/108; 501/112; 501/128; 501/134

(58) Field of Classification Search ............ 106/600, 106/603; 501/32, 49, 53, 88, 97.1, 108, 112, 501/128, 134
See application file for complete search history.

(56) References Cited

U.S. PATENT DOCUMENTS

| | | | | |
|---|---|---|---|---|
| 5,568,652 | A * | 10/1996 | Wu | 264/434 |
| 6,372,033 | B1 * | 4/2002 | Chalasani et al. | 106/140.1 |
| 7,052,735 | B2 | 5/2006 | Nate et al. | 427/230 |
| 2007/0065348 | A1 | 3/2007 | Ohno et al. | |
| 2009/0286041 | A1 * | 11/2009 | Deneka et al. | 428/116 |

FOREIGN PATENT DOCUMENTS

| | | |
|---|---|---|
| EP | 1574491 | 9/2005 |
| EP | 1666146 | 6/2006 |
| EP | 1702909 | 9/2006 |
| JP | 09276708 | 10/1997 |
| WO | WO2006/068767 | 6/2006 |

* cited by examiner

*Primary Examiner* — Paul Marcantoni
(74) *Attorney, Agent, or Firm* — Joseph M. Homa; Matthew J. Mason

(57) ABSTRACT

Disclosed are cement compositions for applying to honeycomb bodies. The cement compositions can be applied as a plugging cement composition, segment cement, or even as after applied artificial skins or coatings. The cement compositions generally include an inorganic powder batch mixture consisting essentially of inorganic particles having a particle size greater than 100 nm. The cement compositions can further include an organic binder, a liquid vehicle, and one or more optional processing aids. Also disclosed are honeycomb bodies having the disclosed cement compositions applied thereto and methods for making same.

14 Claims, 2 Drawing Sheets

US 8,182,603 B2

CEMENT COMPOSITIONS FOR APPLYING TO CERAMIC HONEYCOMB BODIES

RELATED APPLICATIONS

This application claims the benefit of U.S. Provisional Application No. 61/004,785, filed Nov. 30, 2007, entitled "Cement Compositions for Applying to Ceramic Honeycomb Bodies."

TECHNICAL FIELD

The present invention relates to the manufacture of porous ceramic particulate filters, and more particularly to improved cement compositions and processes for sealing selected channels of porous ceramic honeycombs to form wall-flow ceramic filters.

BACKGROUND

Ceramic wall flow filters are finding widening use for the removal of particulate pollutants from diesel or other combustion engine exhaust streams. A number of different approaches for manufacturing such filters from channeled honeycomb structures formed of porous ceramics are known. The most widespread approach is to position plugs of sealing material at the ends of alternate channels of such structures which can block direct fluid flow through the channels and force the fluid stream through the porous channel walls of the honeycombs before exiting the filter. The particulate filters used in diesel engine applications are formed from inorganic materials, chosen to provide excellent thermal shock resistance, low engine back-pressure, and acceptable durability in use. The most common filter compositions are based on silicon carbide, aluminum titanate and cordierite. Filter geometries are designed to minimize engine back-pressure and maximize filtration surface area per unit volume.

Diesel particulate filters can consist of a parallel array of channels with every other channel on each face sealed in a checkered pattern such that exhaust gases from the engine would have to pass through the walls of the channels in order to exit the filter. Filters of this configuration are formed by extruding a matrix that makes up the array of parallel channels and then sealing or "plugging" every other channel with a sealant in a secondary processing step. Pin holes and dimples can extend over the entire length of the plug and cause the part to be rejected by quality control procedures.

Also, during the plugging process, the preformed slug of plugging composition, which is fed into the structure part (from the ram to the interface between the slug and the structure) can run or slump in the reservoir of the piston/cylinder, resulting in difficulties in manufacturing and yields. Additionally, plugging composition formulations can have a pot life which is short due to changes in viscosity over time.

Still further, conventional plugging compositions can also contain particles that migrate into microcracks that have formed in the honeycomb structure being plugged. After drying and firing, this migration of particles into the formed microcracks can negate the CTE reducing effect of the microcracks and can result in increased coefficient of thermal expansion (CTE) for the matrix, at least at the plug surface region of the structure.

SUMMARY

The present disclosure provides improved cement compositions for applying to ceramic honeycomb structures. According to various embodiments, the cement compositions can be applied as a plugging cement composition, segment cement, or even as after applied artificial skins or coatings. The cement compositions generally comprise an inorganic powder batch composition consisting essentially of inorganic powder batch particles having particle sizes greater than 100 nm. By using particles sizes greater than 100 nm, the powder batch particles are of sufficient size to help prevent the intrusion of the powder batch particles into CTE reducing microcracks within the structure of the honeycomb body, thus helping to preserve the CTE reducing effect of those microcracks. The particle sizes of the inorganic powder batch particles can also be selected to control various properties of the cement compositions including plug depths and shrinkage void formation. The cement compositions can further comprise an organic binder component, and a liquid vehicle, which components can also be selected to further control various rheological properties of the cement compositions, including yield strengths, and slump resistance.

In other embodiments, the present disclosure provides methods for manufacturing a porous ceramic wall flow filter. The methods generally comprise providing a porous ceramic honeycomb structure comprised of a microcracked porous ceramic material wherein each microcrack has a maximum microcrack opening displacement. A cement composition as disclosed herein can then be applied to the honeycomb structure. According to some embodiments, at least 90% of the microcracks of the honeycomb structure have a maximum opening displacement less than or equal to 100 nm such that the applied cement composition is comprised of inorganic particles each having a particle size greater than the maximum microcrack opening displacement of at least 90% of the microcracks.

Additional embodiments of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain embodiments of the instant invention and together with the description, serve to explain, without limitation, the principles of the invention.

DETAILED DESCRIPTION

Figure 1:
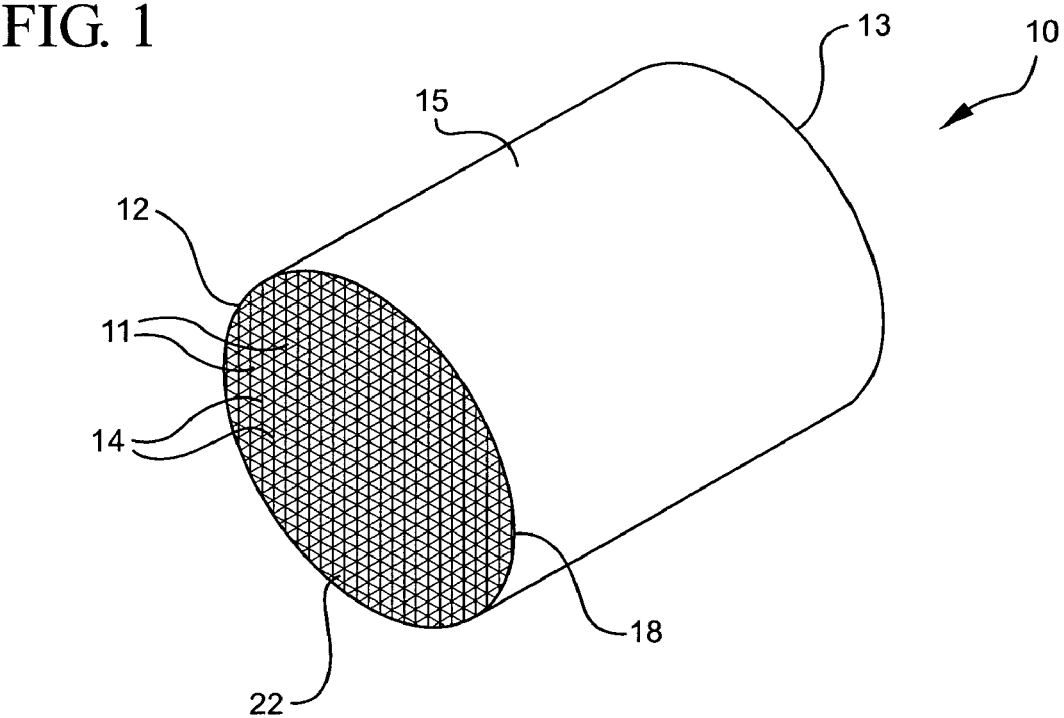
FIG. 1 is an isometric view of porous honeycomb structure.

Those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to an "inorganic powder batch component" includes embodiments having two or more such components unless the context clearly indicates otherwise.

As used herein, a "wt. %" or "weight percent" or "percent by weight" of an inorganic component, unless specifically stated to the contrary, is based on the total weight of the inorganic powder batch composition in which the component is included. The values $D_{10}$ and $D_{50}$ are defined as the diameters at 10% and 50% of the cumulative particle size distribution, with $D_{10}<D_{50}$. Thus, $D_{50}$ is the median particle diameter, and $D_{10}$ is the particle diameter at which 10% of the particle are finer. The value of $D_{90}$ is the particle diameter for which 90% of the particles are finer in diameter; thus $D_{10}<D_{50}<D_{90}$. All particle size measurements herein were made with a Microtrac Inc. particle size analyzer device, unless otherwise noted.

As used herein, a "superaddition" refers to a weight percent of a component, such as for example, an organic binder, liquid vehicle, additive, or pore former, based upon and relative to 100 weight percent of the inorganic powder batch component.

As used herein, the term "optional" or "optionally" means that the subsequently described event or circumstance may or may not occur, and that the description includes instances where said event or circumstance occurs and instances where it does not.

As briefly summarized above, in embodiments of the disclosure cement compositions are provided for applying to porous ceramic honeycomb structures. The cement compositions are generally comprised of inorganic powder batch compositions consisting essentially of inorganic powder batch particles having a particle size greater than 100 nm. By using particles sizes greater than 100 nm, the powder batch particles are of sufficient size to prevent the intrusion of the powder batch particles in CTE reducing microcracks within the structure of the honeycomb body, thus preserving the CTE reducing effect of those microcracks. In exemplary embodiments, the inorganic powder batch particles have a particle size greater than or equal to 1 μm or even greater than or equal to 10 μm. In conventional cement compositions, the presence of inorganic powder batch particles having particle sizes smaller than 100 nm may be attributable, at least in part, to the presence of colloidal inorganic particles, such as a colloidal silica component. Accordingly, in some embodiments, the cement compositions of the present disclosure do not contain any colloidal inorganic particles.

In addition to preventing intrusion of the inorganic powder batch particles into microcracks of the underlying honeycomb structure on which the cement compositions are applied, the particle sizes of the inorganic powder batch components can be further selected to control various performance characteristics of the cement compositions. For example, in some embodiments, the cement compositions are suitable for use as a plugging composition. To that end, the particle sizes of the inorganic powder batch components can be selected to control the achievable plugging depths and to minimize the formation of shrinkage voids. Accordingly, in some embodiments, for the inorganic powder batch particles have a particle size distribution such that at least 99% of the inorganic powder batch particles have a particle size in the range of from 2 to 80 microns. In other embodiments, the inorganic powder batch particles can exhibit a median particle size $D_{50}$ in the range of from 10 μm to 50 μm. In still other embodiments, at least 99% of the inorganic powder batch particles have a particle size in the range of from 2 to 80 microns and the inorganic powder batch particles have a median particle size in the range of from 10 μm to 50 μm. In another, the inorganic powder batch composition consists essentially of inorganic powder batch particles having particle sizes of at least 1 μm. In another embodiment, the inorganic powder batch composition consists essentially of inorganic powder batch particles having particle sizes of at least 10 μm. Still further, in another embodiment, the inorganic powder batch composition consists essentially of inorganic powder batch particles having particle sizes in the range of from about 10 μm to about 45 μm.

The inorganic powder batch composition can be a combination of inorganic batch components sufficient to form a desired sintered phase ceramic composition, including for example a predominant sintered phase ceramic composition comprised of ceramic, glass-ceramic, glass, and combinations thereof. It should be understood that, as used herein, combinations of glass, ceramic, and/or glass-ceramic compositions includes both physical and/or chemical combinations, e.g., compositions or composites. To this end, exemplary and non-limiting inorganic powder batch materials suitable for use in these inorganic powder batch compositions can include particles of one or more fired, i.e., ceramed, inorganic refractory ceramic compositions. Exemplary ceramed inorganic refractory compositions suitable for use in the inorganic powder batch composition include silicon carbide, silicon nitride, aluminum titanate, mullite, calcium aluminate, and cordierite. In some embodiments, the inorganic powder batch composition comprises a fired cordierite composition. Suitable ceramed cordierite compositions for use in the inorganic powder batch can be obtained commercially from known sources, including for example, Corning Incorporated, Corning, N.Y., USA. Alternatively, a suitable cordierite composition can also be manufactured by heating any conventionally known cordierite forming batch composition under conditions effective to convert the batch composition into a crystalline phase cordierite. In one embodiment, a suitable ceramed cordierite consists essentially of from about 49 to about 53 percent by weight $SiO_2$, from about 33 to about 38 percent by weight $Al_2O_3$, and from about 12 to about 16 percent by weight MgO.

According to further embodiments, the inorganic powder batch composition can comprise powdered cordierite having a median particle size $D_{50}$ in the range of from about 10 μm to about 45 μm. In an exemplary embodiment, the powdered cordierite component can comprise a blend of two or more cordierite compositions, each having differing median particle sizes. For example, in one embodiment, the powdered cordierite can comprise a blend of a relatively coarse powdered cordierite and a relatively fine powdered cordierite. As used herein, a relatively coarse cordierite can, for example, include a powdered cordierite having a median particle size in the range of from about 35 μm to about 45 μm. Further, as used herein, a relatively fine powdered cordierite can, for example, include a powdered cordierite having a median particle size in the range of from about 10 μm to about 25 μm. When the powdered cordierite composition is present as a blend of two or more cordierite components having different particles sizes, the inorganic powder batch composition can comprise, for example, from about 40 weight % to about 70% of the relatively coarse powdered cordierite and from about 30 weight % to about 60 weight % of the relatively fine powdered cordierite.

The inorganic powder batch composition can further comprise one or more powdered additive components also exhibiting particle sizes greater than 100 nm. For example, in one embodiment, in addition to the batch components described above, the inorganic powder batch composition can comprise a borosilicate glass. When present in the inorganic powder batch composition, the powdered inorganic additive component can, for example, be used in an amount up to and including 25 weight % of the inorganic batch composition, including exemplary amounts as 1 weight %, 5 weight %, 10 weight %, 15 weight %, 20 weight %, and any range of weight percentages derived from these values. Exemplary commercially available borosilicate glasses included Pyrex® 7761, available from Corning, Inc. of Corning, N.Y., USA, which can be ground to any desired particle size, including particle sizes greater than 100 nm.

To provide the cement compositions of the present disclosure, the inorganic powder batch composition, comprising any of the aforementioned inorganic powder batch materials and any optional inorganic additive components can be mixed together with an organic binder component, a liquid vehicle, and one or more optional additives or processing aids if desired. To that end, the rheology of the cement compositions can further be controlled by modifying the amount of liquid vehicle addition as well as the viscosity of the organic binder component. For example, the liquid vehicle addition and the viscosity of organic binder can be used to control the plugging forces required to plug ceramic honeycomb structures with the disclosed cement compositions as well as to minimize undesirable slump and dimple formation.

Suitable organic binders include water soluble cellulose ether such as, for example, methylcellulose, hydroxypropyl methylcellulose, methylcellulose derivatives, and/or any combinations thereof. An exemplary commercially available methylcellulose binder is Methocel™ A4M available from the Dow Chemical Company of Midland Mich., USA. The organic binder is preferably present in the cement composition as a super addition in an amount in the range of from about 2.0 weight percent to 5.0 weight percent of the inorganic powder batch composition, and more preferably, in an amount in the range of from 2.0 weight percent to 4.0 weight percent of the inorganic powder batch composition. To that end, the incorporation of the organic binder into the batch composition can further contribute to the cohesion and plasticity of the composition. The improved cohesion and plasticity can, for example, improve the ability to shape the cement composition and, when used as a plugging cement, can aid in plugging selected ends of a honeycomb body.

The organic binder can be blended or mixed with the inorganic powder batch composition as a solution, the viscosity of which can be modified to control the rheology of the cement composition. As noted above, in some embodiments the organic binder is a water soluble cellulose ether. According to these embodiments, the organic binder can be introduced as a solution comprising water as the dispersing medium. To that end, in according to exemplary embodiments, the organic binder solution has a viscosity in the range of from 400 to 40,000 cPs when provided as a 2% solution in water at 20° C.

The liquid vehicle is utilized to provide a flowable or paste-like consistency to the cement compositions, for example so that the cement composition can be applied to a honeycomb body as a paste. According to some embodiments, the liquid vehicle is water, although it should be understood that other liquid vehicles exhibiting solvent action with respect to suitable organic binders can be used. The liquid vehicle is preferably present as a super addition in an amount less than or equal to 60% by weight of the inorganic powder batch composition, and more preferably less than 40% by weight of the inorganic powder batch composition. In still other embodiments, the liquid vehicle is present as a superaddition in an amount that does not exceed 35% by weight of the inorganic powder batch composition, including for example a super addition amount of from 25% to 35% by weight of the inorganic powder batch composition. It should also be understood that according to the present invention, it is desirable to minimize the amount of liquid vehicle component while still obtaining a paste like consistency capable of being forced into selected ends of a honeycomb structure. Minimization of liquid components in the inventive compositions can lead to further reductions in undesired slumping, drying shrinkage, and crack formation during the drying process.

In addition to the inorganic powder batch composition, liquid vehicle and binder components, the plugging compositions of the present invention can also comprise one or more optional forming or processing aids. Exemplary processing aids or additives can include pore formers, lubricants, surfactants, plasticizers, and sintering aids. Exemplary lubricants can include hydrocarbon oil, tall oil, or sodium stearate. An exemplary commercially available lubricant is Durasyn® 162 hydrocarbon oil available from Innovene. An exemplary plasticizer for use in the composition can include glycerine. Still further, suitable sintering aids can generally include an oxide source of one or more metals such as strontium, barium, iron, magnesium, zinc, calcium, aluminum, lanthanum, yttrium, titanium, bismuth, or tungsten. In one embodiment, the optional sintering aid comprises a composition of a strontium oxide source, a calcium oxide source and an iron oxide source. In another embodiment, the optional sintering aid comprises at least one rare earth metal. Still further, in another embodiment, a suitable sintering aid can comprise silica.

The resulting cement compositions can exhibit several advantageous rheological properties that render them well suited for use in forming end plugged porous ceramic wall flow filters. In one embodiment, the inventive plugging compositions exhibit yield viscosities sufficient to allow the formation of vertical orientations without the formation of significant slumping or dimpling during the drying and firing process. For example, the plugging compositions of the present invention can exhibit a yield viscosity of at least 50 Pa, at least 100 Pa, at least 150 Pa, at least 200 Pa, at least 250 Pa, or even at least 300 Pa. Further, the inventive compositions also exhibit reduced viscosities under shear enabling the composition to be easily inserted into selected cell channels to be plugged. In turn, the compositions can provide improved ability to control the depth of a desired plug within a channel and can provide more consistent and uniform plug depths. Still further, the compositions of the present invention also help to reduce the occurrence of shrinkage voids during the drying and firing processes.

Once formed, the compositions of the present invention can be fired under conditions effective to convert the cement composition into a primary crystalline phase ceramic composition. For example, according to some embodiments, the disclosed cement compositions can be fired at a temperature of at least 800° C., at least 900° C., or even at least 1000° C. In an exemplary and non-limiting embodiment, effective firing conditions can comprise heating the cement composition at a maximum firing temperature of about 1000° C. wherein the maximum firing temperature is achieved by raising the temperature from room temperature at a ramp up rate of about 120° C./hr. Once the maximum firing temperature is achieved, that temperature is maintained for a soak time of about three hours, followed by a cool down back to room temperature at a rate of about 240° C./hr.

If desired, the cement compositions can also be dried prior to firing in order to substantially remove any liquid vehicle that may be present in the composition. As used herein, "substantially" includes the removal of at least 95%, at least 98%, at least 99%, or even at least 99.9% of the liquid vehicle present in the plugging composition prior to drying. Exemplary and non-limiting drying conditions suitable for removing the liquid vehicle include heating the end plugged honeycomb structure at a temperature of at least 50° C., at least 60° C., at least 70° C., at least 80° C., at least 90° C., at least 100° C., at least 110° C., at least 120° C., at least 130° C., at least 140° C., or even at least 150° C. for a period of time sufficient to at least substantially remove the liquid vehicle from the plugging composition. In some embodiments, the conditions effective to at least substantially remove the liquid vehicle comprise heating the plugging composition at a temperature in the range of from 60° C. to 120° C. Further, the heating can be provided by any conventionally known method, including for example, hot air drying, or RF and/or microwave drying.

Once formed, the cement compositions disclosed herein can be applied to a honeycomb body or structure comprising a plurality of intersecting walls defining a plurality of cell channels bounded by the cell channel walls. An exemplary honeycomb body 10 is shown in FIG. 1 and includes a plurality of generally parallel cell channels 11 formed by and at least partially defined by intersecting cell walls 14 (otherwise referred to as "webs") that extend from a first end 12 to a second end 13. The channels 11 are unplugged and a fluid stream can flow through them straight down the channel from first end 12 to second end 13. Preferably, the honeycomb article 10 also includes a skin 15 which can be formed about the honeycomb structure during extrusion, or may be formed in later processing, for example as an after applied skin described below. In some embodiments, the wall thickness of each cell wall 14 for the structure can be, for example, between about 0.002 to about 0.010 inches (about 51 to about 254 µm). The cell density can be, for example from about 300 to about 900 cells per square inch (cpsi) (about 46 to 140 cells per square centimeter). In one implementation, the cellular honeycomb structure can comprise a multiplicity of parallel cell channels 11 of generally square cross section formed into a honeycomb structure; alternatively, or in addition, other cross-sectional configurations may be used in the honeycomb structure as well, including rectangular, round, oblong, triangular, octagonal, hexagonal, or combinations thereof. As used herein, "honeycomb" refers to the connected matrix structure of cell walls forming longitudinally-extending cells and preferably having a generally repeating pattern therein.

The honeycomb structure can be formed from any material suitable for forming a honeycomb body. For example, in one embodiment, the structure can be formed from a plasticized ceramic forming composition. Exemplary ceramic forming compositions can include those known for forming cordierite, aluminum titanate, silica carbide, aluminum oxide, zirconium oxide, zirconia, magnesium, stabilized zirconia, zirconia stabilized alumina, yttrium stabilized zirconia, calcium stabilized zirconia, alumina, magnesium stabilized alumina, calcium stabilized alumina, titania, silica, magnesia, niobia, ceria, vanadia, nitride, carbide, or any combination thereof.

Still further, according to some embodiments, the honeycomb structure is comprised of a microcracked porous ceramic material, such as for example a porous microcracked aluminum titanate or cordierite, wherein each microcrack has a maximum microcrack opening displacement value. In some embodiments, at least 90% of the microcracks can have a maximum microcrack opening displacement less than 100 nm; such an applied cement composition of the present disclosure is comprised of inorganic powder batch particles having a particle size greater than the maximum microcrack opening displacement of at least 90% of the microcracks. It should be understood that the porous microcracked ceramic material can be any of the above mentioned ceramic materials. Still further, it should also be understood that in some embodiments, the inorganic particles in the applied cement compositions can be the same as or similar to the composition of the ceramic honeycomb structure. For example, the ceramic honeycomb structure can comprise a porous cordierite composition and the applied cement composition can also comprise cordierite particles. However, in an alternative embodiment, the inorganic particles in the applied cement composition can be comprised of one or more ceramic materials which differ from the ceramic material of the porous ceramic honeycomb structure. For example, the cement composition can comprise cordierite particles and the ceramic honeycomb structure can comprise aluminum titanate.

The honeycomb structure can be formed according to any conventional process suitable for forming honeycomb monolith bodies. For example, in one embodiment a plasticized ceramic forming batch composition can be shaped into a green body by any known honeycomb forming process, such as, e.g., extrusion, injection molding, slip casting, centrifugal casting, pressure casting, dry pressing, and the like. The ceramic precursor batch composition can comprise inorganic ceramic forming batch component(s) capable of forming, for example, one or more of the ceramic compositions set forth above, a liquid vehicle, a binder, and one or more optional processing aids including, for example, surfactants, sintering aids, plasticizers, lubricants, and/or a pore former. In an exemplary embodiment, extrusion can be accomplished using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. Once formed, a green honeycomb body can be fired under conditions effective to convert the ceramic forming batch composition into a ceramic composition. Firing conditions for firing the honeycomb green body will depend, at least in part, upon the particular ceramic forming batch composition used to form the honeycomb green body.

In some embodiments, the cement compositions disclosed herein can be used as plugging cements to plug selected channels of a honeycomb body in order to form a wall flow filter. For example, in a honeycomb structure defining a plurality of cell channels bounded by porous cell channel walls as shown in FIG. 1, at least a portion of the plurality of cell channels can include plugs, wherein the plugs are formed from a cement composition as disclosed herein. In some embodiments, a first portion of the plurality of cell channels can include a plug sealed to the respective channel walls at or near the downstream outlet end to form inlet cell channels. A second portion of the plurality of cell channels can also include a plug sealed to the respective channel walls at or near the upstream inlet end to form outlet cell channels. To plug selected channels, the disclosed cement compositions can be forced into selected open cells of a desired porous ceramic honeycomb structure in the desired plugging pattern and to the desired depth, by one of several known plugging process methods. For example, the plugging can be effectuated by using a masking apparatus and process such as that disclosed and described in U.S. Pat. No. 6,673,300, the entire disclosure of which is incorporated by reference herein.

Figure 2:
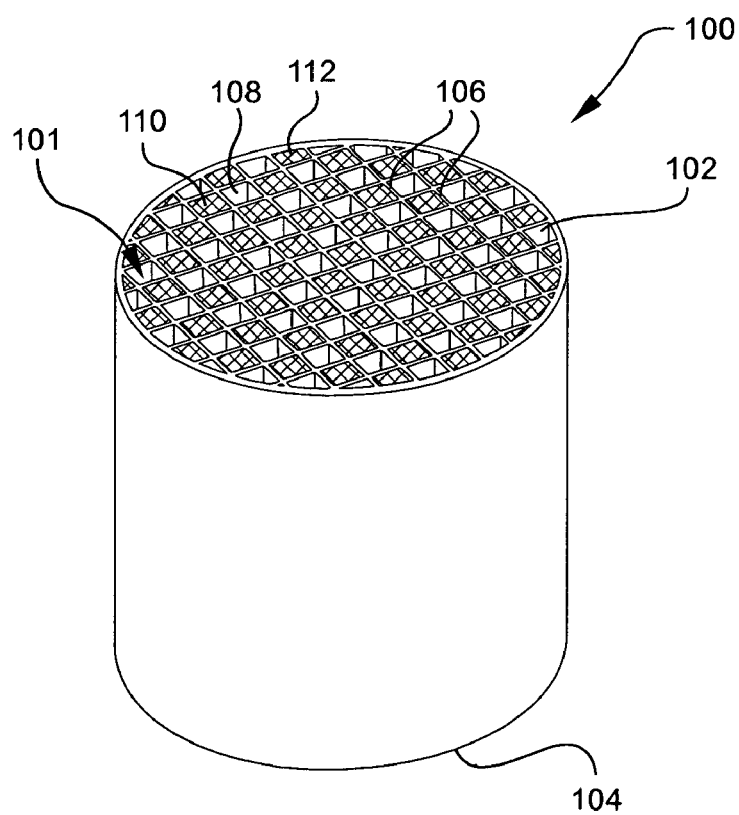
FIG. 2 is an isometric view of porous honeycomb wall flow filter.

With reference to FIG. 2, an exemplary end plugged wall flow filter 100 is shown. As illustrated, the wall flow filter 100 preferably has an upstream inlet end 102 and a downstream outlet end 104, and a multiplicity of cells 108 (inlet), 110 (outlet) extending longitudinally from the inlet end to the outlet end. The multiplicity of cells is formed from intersecting porous cell walls 106. A first portion of the plurality of cell channels are plugged with end plugs 112 at the downstream outlet end (not shown) to form inlet cell channels and a second portion of the plurality of cell channels are plugged at the upstream inlet end with end plugs 112 to form outlet cell channels. The exemplified plugging configuration forms alternating inlet and outlet channels such that a fluid stream flowing into the reactor through the open cells at the inlet end 102, then through the porous cell walls 106, and out of the reactor through the open cells at the outlet end 104. The exemplified end plugged cell configuration can be referred to herein as a "wall flow" configuration since the flow paths resulting from alternate channel plugging direct a fluid stream being treated to flow through the porous ceramic cell walls prior to exiting the filter. Further, the inlet and outlet channels can be any desired shape; for example, as shown in the exemplified embodiment of FIG. 2, the cell channels are square shape.

In other embodiments, the disclosed cement compositions are suitable for use in forming an after applied surface coating or skin on a peripheral region of a honeycomb body or structure. As used herein, "after applied" skin or coating refers to a non co-extruded skin or surface coating on a peripheral region of an extruded honeycomb body. For example, when honeycomb structures are extrusion formed, dried, and fired, the resulting body may need to be resized or shaped in order to comply with desired size and shape tolerances for a given end use application. Accordingly, portions of the outer surface of a formed honeycomb body can optionally be removed by known methods such as sanding, grinding, and the like, in order to obtain a resulting body having a desired shape. After the removal of material from the peripheral portion of the body, the disclosed compositions of the can be applied to the peripheral portion or surface in order to form an after applied skin to the honeycomb body and to re-seal any honeycomb structure channels that may have been exposed or breached due to the removal of material. Once the skin coating has been applied, the applied cement compositions can be dried and fired as described herein.

In still another embodiment, the disclosed compositions can be applied as a segment cement in order to join two or more cellular honeycomb bodies. For example, the cements can be used to join two or more honeycomb bodies lengthwise or in an end to end relationship. Alternatively, the cements can be used to laterally join two or more cellular segments. For example, in some embodiments, it may be desirable to join two or more cellular honeycomb segments together laterally or in a side to side arrangement in order to form a larger cellular or honeycomb structure that may be too large for extrusion forming techniques described above. Once the segment cement has been applied to a honeycomb and the desired number of cellular segments has been joined, the segment composition can again be dried and fired as described herein.

Once the cement composition has been applied to the honeycomb structure in a manner as described herein, the cement composition can be optionally dried and then fired to convert the cement composition to a primary crystalline phase ceramic composition. The optional drying step comprises first heating the cement composition at a temperature and for a period of time sufficient to at least substantially remove any liquid vehicle that may be present in the cement composition. As used herein, at least substantially all includes the removal of at least 95%, at least 98%, at least 99%, or even at least 99.9% of the liquid vehicle present in the cement composition prior to drying. Exemplary and non-limiting drying conditions suitable for removing the liquid vehicle include heating cement composition at a temperature of at least 50° C., at least 60° C., at least 70° C., at least 80° C., at least 90° C., at least 100° C., at least 110° C., at least 120° C., at least 130° C., at least 140° C., or even at least 150° C. In one embodiment, the conditions effective to at least substantially remove the liquid vehicle comprise heating the cement composition at a temperature in the range of from 60° C. to 120° C. Further, the heating can be provided by any conventionally known method, including for example, hot air drying, or RF and/or microwave drying.

According to embodiments, the disclosed compositions are well suited for use as "second fire" cement compositions. To that end, a second fire plugging process comprises plugging a honeycomb body that has already been fired to provide a ceramic honeycomb structure prior to applying the disclosed cement compositions. Therefore, the conditions effective to second fire the disclosed cement composition will generally only depend upon the composition of the cement composition itself and not upon the composition of the underlying ceramic honeycomb structure. To that end, as noted above, the cement compositions of the present invention can be fired at temperatures greater than 800° C., 900° C., and even greater than 1000° C.

EXAMPLES

To further illustrate the principles of the present invention, the following examples are put forth so as to provide those of ordinary skill in the art with a complete disclosure and description of how the plugging compositions and methods claimed herein are made and evaluated. They are intended to be purely exemplary of the invention and are not intended to limit the scope of what the inventors regard as their invention. Unless indicated otherwise, parts are parts by weight, temperature is ° C. or is at ambient temperature, and pressure is at or near atmospheric.

In the following Example, two cement compositions were prepared and applied to a porous ceramic honeycomb structure comprised of a microcracked porous ceramic material. The specific batch compositions for these cements are set forth in Table 1 below:

TABLE 1

| Ingredient | Composition A | Composition B |
| --- | --- | --- |
| Cordierite Powder | 80 wt % | 80 wt % |
| Borosilicate Glass | 20 wt % | 20 wt % |
| Colloidal Silica* | 25 wt % | — |
| Organic Binder* | 2 wt % | 2 wt % |
| Lubricant* | 6 wt % | 6 wt % |
| Fused Silica* | — | 10 wt % |
| Water* | 30 wt % | 45 wt % |

*indicates the weight percentage for the batch ingredient was calculated as a superaddition relative to the combined total weight of the powdered cordierite and borosilicate glass.

Figure 3:
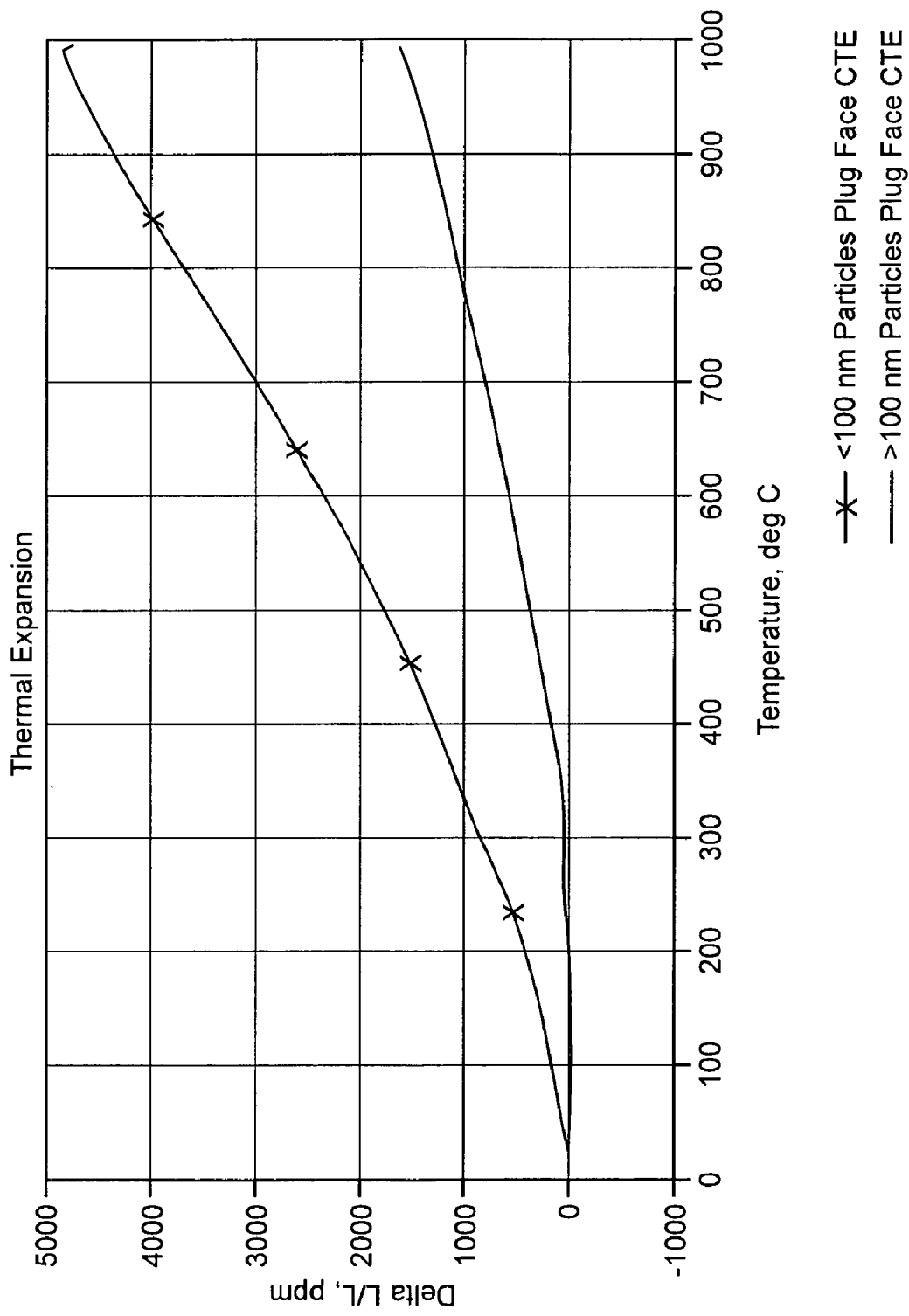
FIG. 3 is a graphical illustration of the impact of the inorganic powder batch particle size on the resulting CTE of an end plugged honeycomb structure.

Both of the two cement compositions (Composition A and B) contained: cordierite powder having a $D_{10}$ of 3.34 microns, a $D_{50}$ of 23.06 microns, a d90 of 70.88 microns, and a minimum measured particle size of 0.82 microns; and borosilicate glass powder having a $D_{10}$ of 4.12 microns, a $D_{50}$ of 30.74 microns, a $D_{90}$ of 109.1 microns, and a minimum measured particle size of 1.16 microns. The first of the two cement compositions (composition A) was comprised of an inorganic powder batch composition comprising inorganic powder batch particles having a particle sizes smaller than 100 nm, due to the incorporation of the colloidal silica which had particles less than 100 nm. The second of the two cement compositions (composition B) was an inventive cement composition that did not contain colloidal silica and which was comprised of an inorganic powder batch composition consisting essentially of inorganic powder batch particles having particle sizes greater than 100 nm, namely the cordierite powder and borosilicate glass powder mentioned above as well as fused silica having a $D_{10}$ of 3.31 microns, a $D_{50}$ of 13.23 microns, a $D_{90}$ of 35.21 microns, and a minimum measured particle size of 1.38 microns. The two compositions were then evaluated to determine the effect of inorganic powder batch particle size on microcrack reduced coefficient of thermal expansion at that plug face of the plugged parts when fired at temperatures of up to approximately 1000° C. The results of the evaluation of plotted graphically in FIG. 3. It can be seen from the thermal expansion data of FIG. 3 that the composition comprising inorganic powder batch particles having particle sizes less than 100 (line marked with "X") nm resulting in a relatively higher increase in coefficient of thermal expansion compared to the plugging composition comprised of the inorganic powder batch composition consisting essentially of inorganic powder batch particles larger than 100 nm (for example, such as by comparing mean CTE values taken by dividing the difference between the ΔL/L at °800 C. and at 25° C. by the temperature difference (i.e. 800-25° C.). It is believed that the relative increase in CTE witness for composition A is a result of the migration of the smaller particles (less than 100 nm) into the formed microcracks of the porous honeycomb structure which negates any CTE reducing effect of the microcracks and actually results in the increased coefficient of thermal expansion (CTE) for the matrix, at least at the plug surface region of the structure.

Lastly, it should also be understood that while the present invention has been described in detail with respect to certain illustrative and specific embodiments thereof, it should not be considered limited to such, as numerous modifications are possible without departing from the broad scope of the present invention as defined in the appended claims.

The invention claimed is:

1. A cement composition for applying to a ceramic honeycomb body, comprising:
   an inorganic powder selected from the group consisting of cordierite, silicon carbide, silicon nitride, aluminium titanate, mullite, and calcium aluminate having a particle size greater than 100 nm;
   borosilicate glass;
   colloidal silica or fused silica;
   organic binder;
   lubricant; and
   water.

2. The cement composition of claim 1, wherein the cement composition further comprises a liquid vehicle.

3. The cement composition of claim 1, wherein the cement composition further comprises an organic binder having a viscosity in the range of from 400 to 40,000 cPs when provided as a 2% solution in water at 20° C.

4. The cement composition of claim 3, wherein the organic binder is present as a super addition in an amount in the range of from about 2 weight % to about 5 weight % relative to the inorganic powder batch composition.

5. The cement composition of claim 1, wherein the ceramic honeycomb body is comprised of microcracked porous ceramic material.

6. The cement composition of claim 1, wherein the cement composition contains no colloidal inorganic particles.

7. The cement composition of claim 1, wherein the inorganic powder batch particles have a median particle size $D_{50}$ in the range of from 10 μm to 50 μm.

8. The cement composition of claim 1, wherein at least 99% of the inorganic powder batch particles have a particle size of between 2 and 80 microns.

9. The cement composition of claim 1, wherein the inorganic powder batch particles have a median particle size $D_{50}$ of between 10 μm to 50 μm and wherein at least 99% of the inorganic powder batch particles have a particle size of between 2 and 80 microns.

10. The cement composition of claim 1, wherein the inorganic powder batch composition comprises ceramed refractory cordierite particles.

11. The cement composition of claim 10, wherein the cordierite particles have a median particle size $D_{50}$ of between 10 μm to 45 μm.

12. The cement composition of claim 10, wherein the cordierite particles are present as a blend of a first portion of cordierite particles having a median particle size in the range of from 35 μm to 45 μm and a second portion of cordierite particles having a median particle size in the range of from 10 μm to 25 μm.

13. The cement composition of claim 1, wherein the inorganic powder batch particles each have a particle size greater than or equal to 1 μm.

14. The cement composition of claim 1, wherein the inorganic powder batch particles each have a particle size greater than or equal to 10 μm.

* * * * *